(12) United States Patent
Hoffman et al.

(10) Patent No.: US 8,769,703 B2
(45) Date of Patent: Jul. 1, 2014

(54) SYSTEM AND METHOD FOR PROVIDING A MECHANISM TO VIRTUALIZE A PERPETUAL, UNIQUE SYSTEM IDENTITY ON A PARTITIONED COMPUTER SYSTEM

(75) Inventors: Phillip M. Hoffman, Oreland, PA (US); Jeffery A. Stell, Exton, PA (US); Jessica A. Paragas, Springfield, PA (US); Tatyana Martsun, Philadelphia, PA (US); Steven D. Schatz, Eagleville, PA (US); Robert K. Liermann, Downington, PA (US); Robert J. Sliwa, Chalfont, PA (US)

(73) Assignee: Unisys Corporation, Blue Bell, PA (US)

( * ) Notice: Subject to any disclaimer, the term of this patent is extended or adjusted under 35 U.S.C. 154(b) by 654 days.

(21) Appl. No.: 11/647,683

(22) Filed: Dec. 29, 2006

(65) Prior Publication Data

US 2007/0256144 A1      Nov. 1, 2007

Related U.S. Application Data

(60) Provisional application No. 60/795,628, filed on Apr. 27, 2006.

(51) Int. Cl.
| | |
|---|---|
| *G06F 21/00* | (2013.01) |
| *G06F 21/10* | (2013.01) |
| *G06F 21/73* | (2013.01) |
| *G06F 21/12* | (2013.01) |

(52) U.S. Cl.
CPC ............... *G06F 21/10* (2013.01); *G06F 21/73* (2013.01); *G06F 21/121* (2013.01)
USPC .................... 726/28; 726/5; 726/16; 713/193

(58) Field of Classification Search
CPC ........ G06F 21/10; G06F 21/73; G06F 21/121
USPC ......................................... 726/5, 16; 713/193
See application file for complete search history.

(56) References Cited

U.S. PATENT DOCUMENTS

| | | |
|---|---|---|
| 3,643,227 A | 2/1972 | Smith |
| 5,327,557 A | 7/1994 | Emmond |
| 5,452,461 A | 9/1995 | Umekita |
| 6,148,407 A | 11/2000 | Aucsmith |
| 6,314,501 B1 | 11/2001 | Gulick |

(Continued)

OTHER PUBLICATIONS

Saltzer, "The Protection of Information in Computer Systems", 1975, IEEE, p. 1278-1308.*

(Continued)

*Primary Examiner* — Taghi Arani
*Assistant Examiner* — Gregory Lane
(74) *Attorney, Agent, or Firm* — Richard J. Gregson

(57) ABSTRACT

A computing system using a persistent, unique identifier may be used to authenticate the system that ensures software and configurations of systems are properly licensed while permitting hardware components to be replaced. The persistent, unique system identifier may be coupled to serial numbers or similar hardware identifiers of components within the computing system while permitting some of the hardware components to be deleted and changed. When components that are coupled to the persistent, unique identifier are removed or disabled, a predefined time period is provided to update the coupling of the persistent, unique identifier to alternate hardware component in the system.

22 Claims, 9 Drawing Sheets

(56) References Cited

U.S. PATENT DOCUMENTS

| | | | |
|---|---|---|---|
| 6,353,844 | B1 | 3/2002 | Bitar |
| 6,684,390 | B1 | 1/2004 | Goff |
| 7,610,425 | B2 | 10/2009 | Solomita |
| 2002/0049841 | A1 | 4/2002 | Johnson |
| 2002/0059274 | A1 | 5/2002 | Hartsell |
| 2002/0065864 | A1 | 5/2002 | Hartsell |
| 2003/0046566 | A1* | 3/2003 | Holopainen ............ 713/193 |
| 2003/0101208 | A1 | 5/2003 | Chauvel |
| 2003/0105798 | A1 | 6/2003 | Kim |
| 2003/0135380 | A1 | 7/2003 | Lehr |
| 2003/0152084 | A1 | 8/2003 | Lee |
| 2004/0025161 | A1 | 2/2004 | Chauvel |
| 2004/0133792 | A1 | 7/2004 | Dublish et al. |
| 2004/0199760 | A1* | 10/2004 | Mazza et al. ............ 713/150 |
| 2005/0010664 | A1 | 1/2005 | Hubbard |
| 2005/0027657 | A1 | 2/2005 | Leontiev et al. |
| 2005/0066328 | A1 | 3/2005 | Lam |
| 2005/0071688 | A1 | 3/2005 | Hepner |
| 2005/0091655 | A1 | 4/2005 | Probert |
| 2005/0138349 | A1 | 6/2005 | Hoffman |
| 2005/0138422 | A1 | 6/2005 | Hancock |
| 2005/0240925 | A1 | 10/2005 | Ault |
| 2006/0100962 | A1 | 5/2006 | Wooldridge et al. |

OTHER PUBLICATIONS

Lundberg L., "Static process allocation using information about program behaviour" Proceedings of the Annual Hawaii Int'l Conf. on System Sciences. vol. 1, Nov. 8, 1991.

PCT/US2007/009995 International Search Report dated Nov. 11, 2007.

WO 03/021403 A (Nokia Corp [FI]), Mar. 13, 2003, the whole document.

EP 1 469 369 A (Microsoft Corp), [US]), Oct. 20, 2004, the whole document.

Graham, S.L.: "gprof: a call graph execution profile", ACM SIGPLAN Notices ACM, Association for Computing Machinery, New York, NY US vol. 17, No. 6, Jun. 1982, pp. 120-126, XP002451925, ISSN: 0362-1340, Abstract, p. 122, left handed column, line 66-right hand column, line 54.

Rauber, T., et al.: "M-Task-Programming for Heterogeneous Systems and Grid Environments"; Parallel and Distributed Processing Symposium, 2005. Proceedings. 19th IEEE International Denver, CO, USA Apr. 4-8, 2005 Piscataway, NJ USA, IEEE Apr. 4, 2005, pp. 178b-178b, XP010785726, ISBN: 0-7695-2312-9, p. 4, right hand column, line 26—p. 7, left hand column, line 2; figures 4, 5.

* cited by examiner

System ID Key Format

| Word | Field | Data | Description |
|------|-------|------|-------------|
| 1 | 31:04 | Key Type | System ID Key (value=9) |
|  | 27:01 | Extended Version | Extended Version Field Flag (value=TRUE) |
|  | 26:07 | Key Version | System ID Key Version (value=9) |
|  | 19:20 |  | <unused> |
| 2 | 31:32 | Unique Key ID | Key Creation Date and Time (seconds since midnight 01/01/1970) |
| 3 | 31:32 | System ID | Unique System ID Value |
| 4 | 31:16 | Machine ID | Machine ID (value = x012B for Libra 680, x022B for Libra 690) |
|  | 15:05 | Cell Serial Number Code | Code indicating next item is the licensing cell serial number (value=3) |
|  | 10:11 | Licensing Cell Serial Number | Unique licensing cell serial number is 32 bits wide split between words 4 and 5 |
| 5 | 31:21 |  |  |
|  | 10:05 | End Code | End of Licensing Data (value=0) |
|  | 05:06 |  | <unused> |

Server Control Resource Licensing Data Memory Map (Level 1)

| Console Server Data Address | Updated by What? | Contents | Description | |
|---|---|---|---|---|
| x0000 | SC & MCP | Locking Word | Value – unlocked (xFFFFFFFF) or locking partition number | 520 |
| x0001 | MCP | <reserved> | | 521 |
| x0002 | SC & MCP | Partition Update Info | Used to detect new Server Control data<br>[31:04] update part ID<br>[27:04] update part type<br>  Console Server = 0<br>  Native MCP = 1<br>[23:24] update counter | 522 |
| x0003 | SC & MCP | Partition Update Timestamp | Posix timestamp of update (time since midnight 01/01/1970) | 523 |
| x0004 | SC only | Root Link | Value = x00010005<br>[31:16] Size of CS root data<br>[15:16] Index of CS root data | 524 |
| x0005 | SC only | Physical Cell Serial Number Link | Value = x00080006<br>[31:16] Size of Cell SN data<br>[15:16] Index of Cell SN data | 525 |
| x0006-x000D | SC only | Physical Cells Serial Number list | Used to uniquely identify cells | |
| x000D - x001F | | <reserved> | | |
| x0020 - x7FFF | MCP only | Persistent Resource Licensing Data | | 526 |
| x002B<br>x002D | | | System ID<br>Licensing Cell Serial Number | |
| x8000 – xBFFF | SC – inactive partitions<br>MCP – Active partitions | Active Physical Partition Resource Licensing Data | Note: The first word for each active partition data region should be initialized as follows:<br>  Inactive = 0<br>  Native MCP = 1<br>Physical Partition 0: x8000–x87FF<br>Physical Partition 1: x8800–x8FFF<br>Physical Partition 2: x9000–x97FF<br>Physical Partition 3: x9800–x9FFF<br>Physical Partition 4: xA000–xA7FF<br>Physical Partition 5: xA800–xAFFF<br>Physical Partition 6: xB000–xB7FF<br>Physical Partition 7: xB800–xBFFF | 527 |

FIG. 5b

Timing System ID Entry

| Word | Field | Data | Description |
|---|---|---|---|
| 0 | 31:01 | System ID Timing | System ID Timing Flag 530 |
|  | 30:31 | System ID | System ID Value 531 |
| 1 | 31:32 | Timestamp | Timing Date and Time (seconds since midnight 01/01/1970) 532 |
| 2 | 31:01 |  | <reserved> |
|  | 30:27 | Seconds | Seconds Left on the Clock 533 |
|  | 04:05 |  | <reserved> |

SYSTEM AND METHOD FOR PROVIDING A MECHANISM TO VIRTUALIZE A PERPETUAL, UNIQUE SYSTEM IDENTITY ON A PARTITIONED COMPUTER SYSTEM

STATEMENT REGARDING RELATED APPLICATIONS

This patent application claims priority under 35 U.S.C. §119(e) to U.S. Provisional Patent Application Serial No. 60/795,628, filed on Apr. 27, 2006, entitled "SYSTEM AND METHOD FOR PROVIDING A MECHANISM TO VIRTUALIZE A PERPETUAL, UNIQUE SYSTEM IDENTITY ON A PARTITIONED COMPUTER SYSTEM," the entire contents of which are hereby incorporated by reference.

FIELD OF THE INVENTION

The present invention relates generally to techniques for providing processing services within a multi-processor computing system, and, in particular, to techniques for providing a mechanism to virtualize a perpetual, unique system identity on a partitioned computer system.

BACKGROUND OF THE INVENTION

Due to the very high value of resource licensing (processor performance, processor metering, memory licensing, IO licensing) on large, multi-processor computing systems, a license is intended to run on one and only one system. To do this, both the resource licenses and the physical hardware must contain some type of ID that ties both together. Previously this licensing ID (aka MCN) has been the physical serial number of a cell 0 module that contains hardware components like processors, memory, and IO components. This cell 0 serial number would be created uniquely across the corporation, and would be visible across the entire system even if the system was further subdivided into separate OS instantiations or partitions. Thus all OS partitions could see this ID even if the cell 0 was not part of the current active OS partition.

Thus licensing uniqueness is guaranteed and resource licensing keys linked to this licensing ID are not transferable to other systems. Furthermore on metering systems, this unique licensing ID is used to identify customers when monthly metering reports are automatically sent by a metering system to a corresponding billing system.

Problems occur when there is a problem retrieving the licensing serial number from cell 0. The system immediately becomes unusable if a hardware problem renders cell 0 unusable because the system identity no longer matches the serial number in the system resource keys. If cell 0 is replaced, it will have a new cell serial number and all of the resource licensing keys will have to be replaced. For metering systems, related billing systems will have to be aware that the new identity for the replacement cell 0 is associated with an existing customer and may have to coalesce multiple metering reports to create a unified metering report for the period when the cell was replaced.

In all, it is a usability, support, and billing nightmare when cell 0 and its associated system identity fail. Details regarding this multi-workload processor based computing system is described in more detail in concurrently filed and commonly assigned U.S. Provisional Patent Application entitled "SYSTEM AND METHOD FOR SEPARATING MULTIPLE WORKLOADS PROCESSING IN A SINGLE COMPUTER OPERATING ENVIRONMENT," by Thompson et al., Attorney Docket No. TN472, filed 27 Apr. 2006, which is incorporated by reference herein in its entirety. Functionality of multi-workload metering system is described in more detail in concurrently filed and commonly assigned U.S. Provisional Patent Application entitled "SYSTEM AND METHOD FOR SEPARATING MULTI-WORKLOAD PROCESSOR UTILIZATION ON A METERED COMPUTER SYSTEM," by Thompson et al., Attorney Docket No. TN471, filed 27 Apr. 2006, which is incorporated by reference herein in its entirety.

SUMMARY OF THE INVENTION

Problems in the prior art are addressed in accordance with the principles of the present invention by providing a mechanism to virtualize a perpetual, unique system identity on a partitioned computer system.

In one embodiment, the present invention is a computing system using a persistent, unique identifier may be used to authenticate the system that ensures software and configurations of systems are properly licensed while permitting hardware components to be replaced. The persistent, unique system identifier may be coupled to serial numbers or similar hardware identifiers of components within the computing system while permitting some of the hardware components to be deleted and changed. When components that are coupled to the persistent, unique identifier are removed or disabled, a predefined time period is provided to update the coupling of the persistent, unique identifier to alternate hardware component in the system.

In another embodiment, the present invention is a method for providing a persistent, unique identifier associated with authorizing an operational configuration of a computing system. The computing system has a server control module, a plurality of cells a system type, a system ID, a licensing cell serial number, and a list of hardware component serial numbers. The method generates a system ID key that contains the imbedded system type, the system ID, and the licensing cell serial number. The server control module or any software partition that has visibility to server control module licensing data can be used to install the licensing identification information. The server control module or any software partition decrypts the system ID key to extract the system type, the system ID, and the licensing cell serial number. If the extracted system type matches the actual system type and the extracted licensing cell serial number matches any serial number in the list of hardware component serial numbers currently present within the computing system, then both the extracted system ID and the extracted licensing cell serial number is stored in the server control module. The system ID is periodically validated by the software partition by comparing the stored licensing cell serial number with list of hardware component serial number currently present within the computing system. The licensed resources associated with this system ID are periodically validated by the software partition to verify permitted utilization of recourses within the computer system.

In another embodiment, the present invention is a computer data product, having encoded thereon program code, wherein, when the program code is executed by a machine, the machine implements a method for providing a persistent, unique identifier associated with authorizing an operational configuration of a software partition executing within a computing system. The computing system has a server control module, a plurality of cells a system type, a system ID, a licensing cell serial number, and a list of hardware component serial numbers. The method installs the software partition within one or more cells, the software partition corresponding to an instance of an operating system executing within the one or more cells, and installs system ID key licensing information within the server control module by decrypting the system ID key to extract the system type, the system ID and the licensing cell serial number. If the extracted system type and the extracted licensing cell serial number match the actual system type and any one of the hardware component serial number present within the computer system, then the extracted system ID and extracted licensing cell serial number are stored in the server control module. The system ID and system resources associated with this system ID are validated comparing the stored licensing cell serial number against the list of hardware component serial number present on the system.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIGS. 4a-4b illustrate an example embodiment for a computing system utilizing System ID according to the present invention;

FIG. 5a-5c illustrate an example of a computing system utilizing a Server Control module memory map and an example of a Timing System ID data entry for use in connection with the present invention.

DETAILED DESCRIPTION

Figure 1:
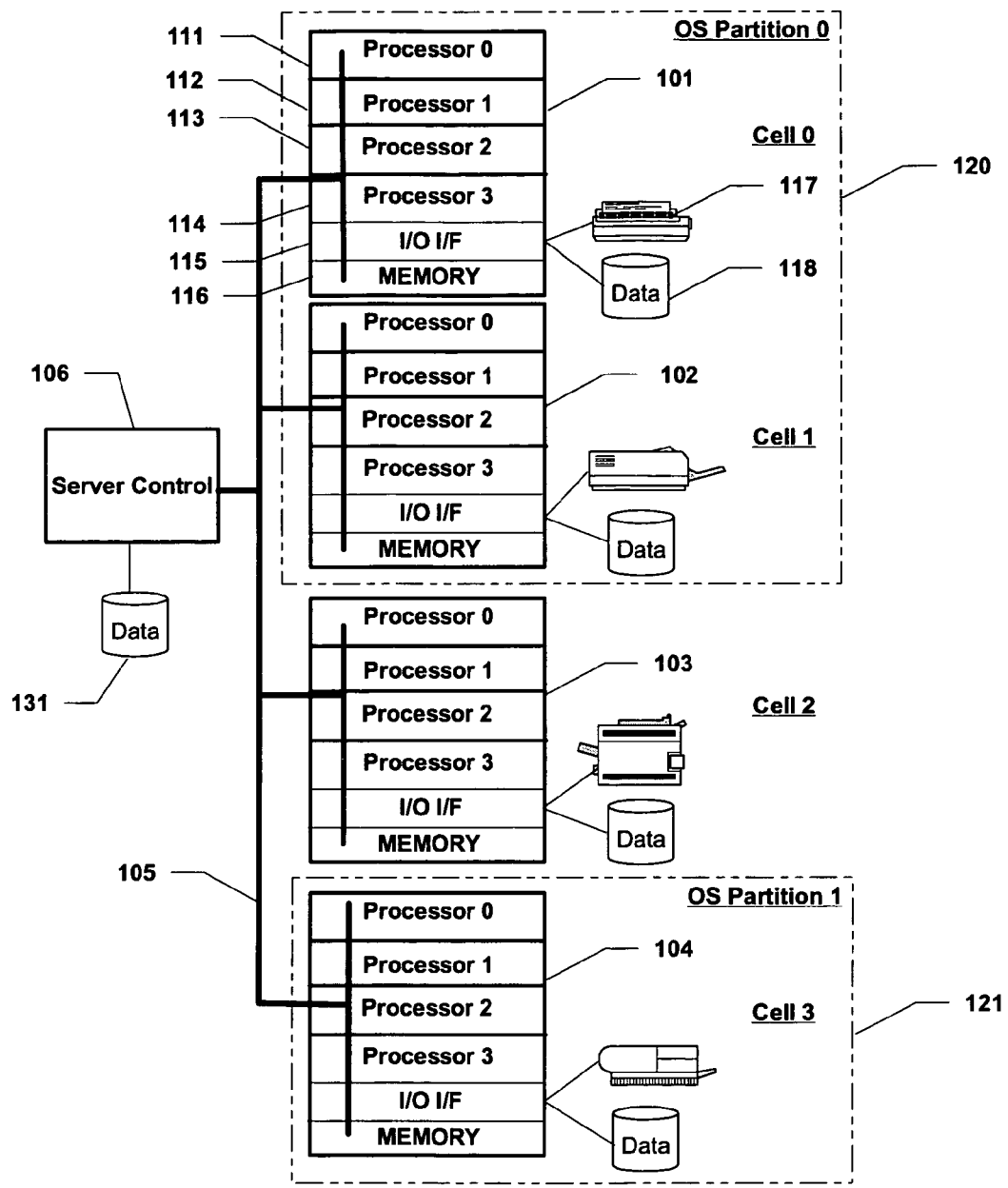
FIG. 1 illustrates an example of a multiple workload processing-based computing system according to an embodiment of the present invention.

FIG. 1 illustrates an example of a multiple workload processing-based computing system according to an embodiment of the present invention. In this example, a system 100 is constructed from a set of cells 101-104 that are connected together via a high-speed data bus 105. Also connected to the bus 105 is a server control module 106 that provides supervisory control of the system. Server control module 106 maintains persistent data 131 regarding various configurations of system software that may be enabled.

Two different OS partitions 120-121 are present in the example configuration of FIG. 1. An OS partition is an instantiation of an operating system onto a computing system. The two partitions 120-121 may consist of two instantiations of the same OS. These two partitions 120-121 may also consist of an instantiation of two different operating systems. OS partition 0 120 operates using cells 0 and cell 1 101-102. OS partition 1 121 operates on cell 3 104. Cell 2 102 is currently not in use but may represent a spare cell available if any other cells fail.

Within each cell, a set of processors are present along with system memory and I/O interface modules. For example, cell 0 101 includes processor 0, processor 1, processor 2, and processor 3 111-114, I/O interface module 115, and memory module 116. Peripheral devices 117-118 are connected to I/O interface module 115 for use by any tasks executing within OS partition 0 120. All of the other cells within system 100 are similarly configured with multiple processors, system memory and peripheral devices. While the example shown in FIG. 1 illustrates cells 0 through cells 3 101-104 as being similar, one of ordinary skill in the art will recognize that each cell may be individually configured to provide a desired set of processing resources as needed.

Figure 2:
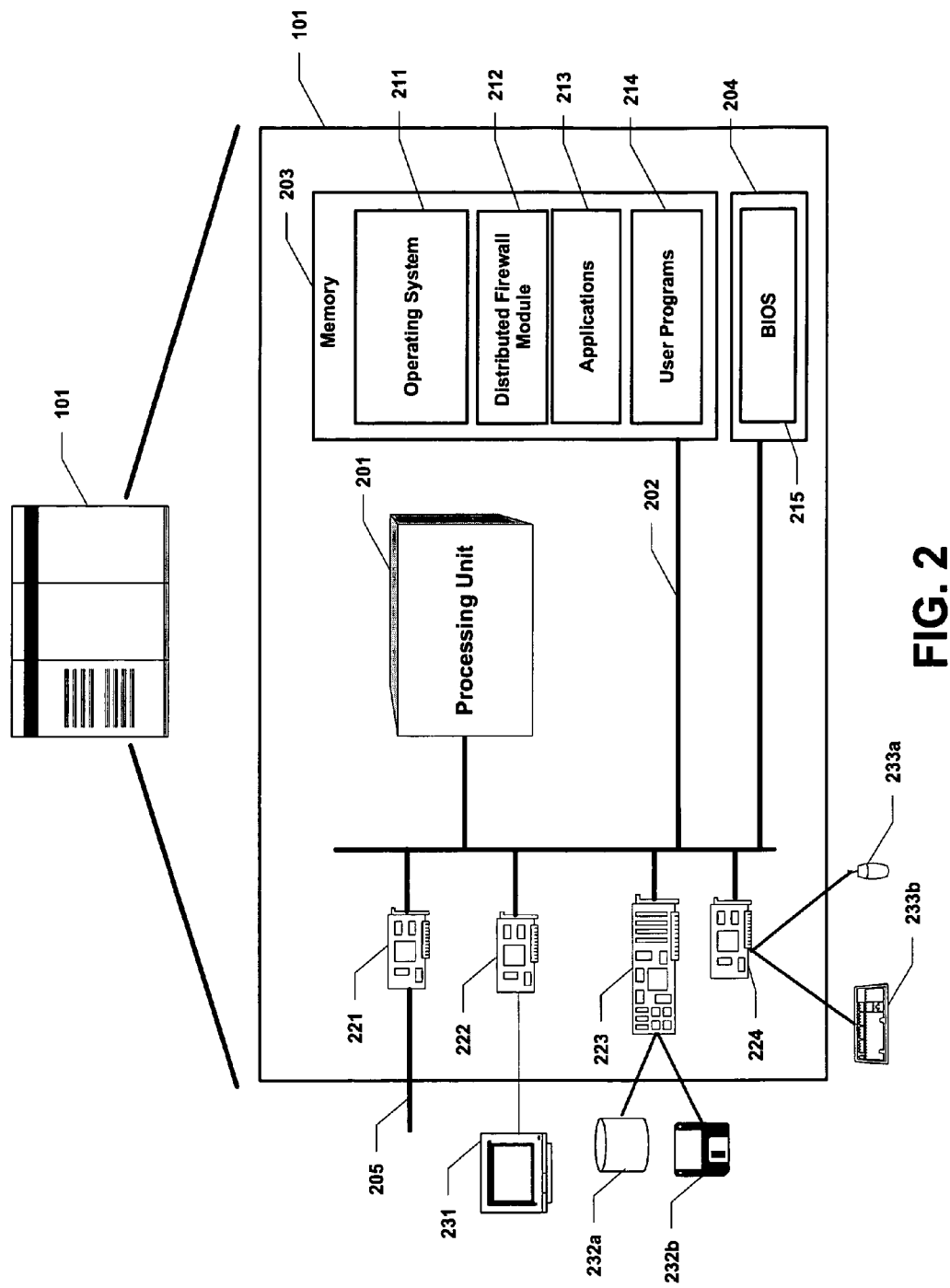
FIG. 2 illustrates a general purpose computing system for implementing various embodiments of the present invention.

FIG. 2 illustrates a general purpose computing system for implementing various embodiments of the present invention. Those of ordinary skill in the art will appreciate that the computing system 101 may include many more components than those shown in FIG. 2. However, the components shown are sufficient to disclose an illustrative embodiment for practicing the present invention. As shown in FIG. 2, computing system 101 is connected to WAN/LAN 100, or other communications network, via network interface unit 221. Those of ordinary skill in the art will appreciate that network interface unit 221 includes the necessary circuitry for connecting computing system 101 to WAN/LAN 100, and is constructed for use with various communication protocols including the TCP/IP protocol. Typically, network interface unit 221 is a card contained within computing system 101.

The computing system 101 also includes processing unit 201, video display adapter 222, and a mass memory, all connected via bus 202. The mass memory generally includes RAM 203, ROM 204, and one or more permanent mass storage devices, such as hard disk drive 232a, a tape drive, CD-ROM/DVD-ROM drive, and/or a floppy disk drive 232b. The mass memory stores operating system 221 for controlling the operation of the programmable computing system 101. It will be appreciated that this component may comprise a general purpose server operating system as is known to those of ordinary skill in the art, such as UNIX, MAC OS X™, LINUX™, or Microsoft WINDOWS XP™. Basic input/output system ("BIOS") 215 is also provided for controlling the low-level operation of computing system 101. While the example of FIG. 2 contains a single processor-based system, one of ordinary skill in the art will recognize this computing system may contain multiple processing modules as discussed above in reference to FIG. 1.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a host computing system. More specifically, the mass memory stores applications including host application program 213, user programs 214, and distributed firewall module 212.

The computing system 101 also comprises input/output interface 224 for communicating with external devices, such as a mouse 233a, keyboard 233b, scanner, or other input devices not shown in FIG. 2. Likewise, computing system 101 may further comprise additional mass storage facilities such as CD-ROM/DVD-ROM drive and hard disk drive 232a. Hard disk drive 232a is utilized by computing system 101 to store, among other things, application programs, databases, and program data used by various application programs.

The embodiments of the invention described herein are implemented as logical operations in a general purpose computing system. The logical operations are implemented (1) as a sequence of computer implemented steps or program modules running on a computer system and (2) as interconnected logic or hardware modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 3B:
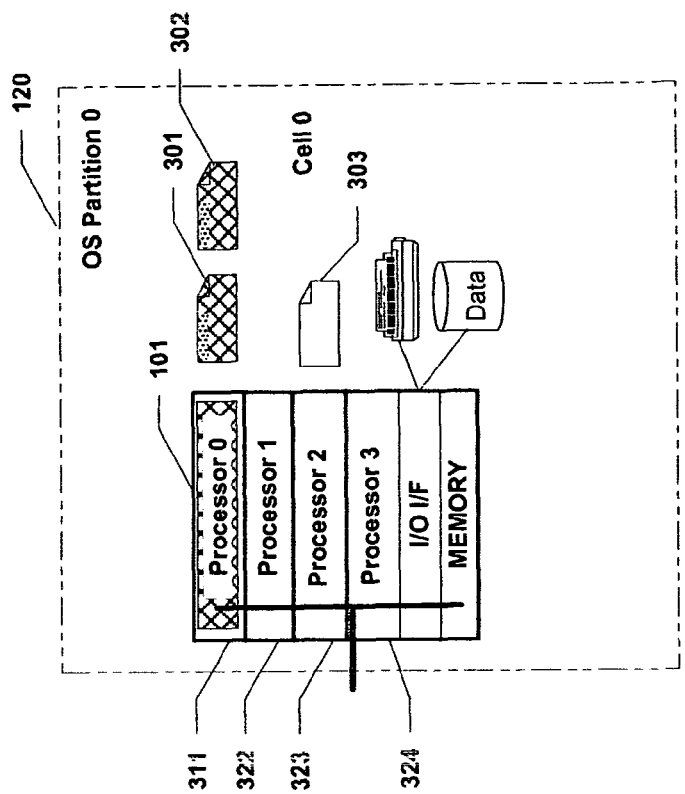
FIGS. 3a-3c illustrate example embodiments of a multi-processor-based processing system configured as various workload sets according to one embodiment of the present invention.
Figure 3A:
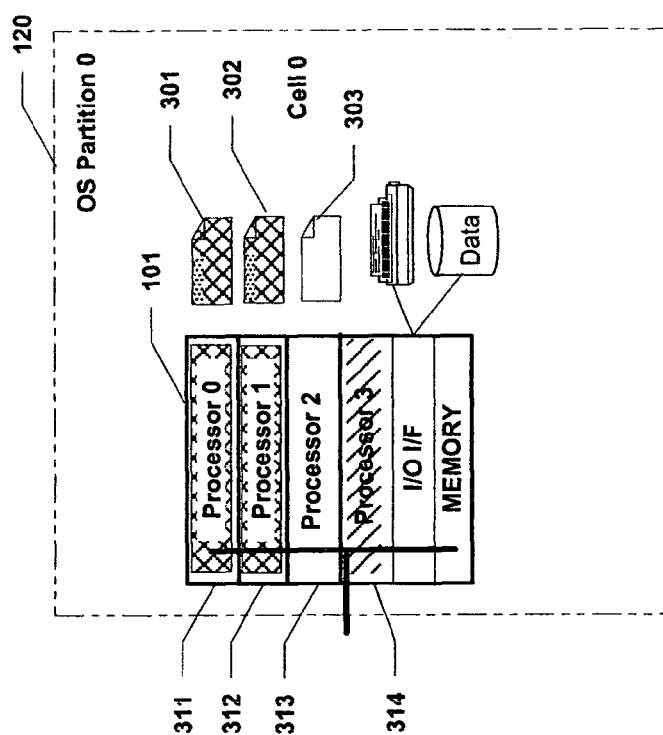

FIGS. 3a-3b illustrate example embodiments of a multi-processor-based processing system configured as various workload sets according to one embodiment of the present invention. In these two embodiments, OS partition 0 120 of FIG. 1 is shown using just cell 0 101. In the embodiment of FIG. 3a, processor 0 and processor 1 311-312 are shown operating as Java processors. Processor 2 313 is shown operating as a standard processor and processor 3 314 is not enabled for use and may act as a spare processor.

Java processors 311-312 in this example correspond to processors that are configured to efficiently perform Java tasks 301-302. These processors may be configured to utilize different microcode instructions applicable to Java tasks. These processors may possess customized hardware to support the Java tasks. Finally, these processors may be configured to operate at a particular performance level relative to a maximum possible processing throughput to adequately support Java tasks.

Standard processor 313 corresponds to a processor that is configured to support other processing tasks 303 present within OS partition 0 120. This processor 313 may not necessarily possess customize microcode or specialized processing hardware. Additionally, processors may be configured to operate at a different performance level relative to a maximum possible processing throughput to provide cost effective processing. In some embodiments of multi-processor systems, users are billed for the system providing a pre-defined processing throughput. When a higher level of processor performance provided, a user may be charged a higher cost. As such, processing levels for the standard processors may be set accordingly.

When a task is executed within an OS partition 120, the task is assigned to a particular processor depending upon whether the tasks is a Java task 301 or a standard task 303. A child task 302 that is created by an existing task 301 is classified as a task of the same workload type. Java tasks 301-302 are performed by Java processors 311-312 when they are present within a configured system. If a Java processor is not included within a configured system, the Java tasks 301-302 are performed by a standard processor.

FIG. 3b illustrates the one cell example from FIG. 3a where cell 0 101 is configured to possess only one Java processor 311 and three standard processors 322-324. In this configuration, Java tasks 301-302 execute on Java processor 311 and standard task 303 may execute on any of the standard processors 322-324. The number of Java processors and the number of standard processors may be varied within various configurations for a OS partition 120 as required by a user to support a particular mix of tasks to be performed. When the mix of processing tasks are changed, a different configuration for the OS partition may be configured.

In the above description of various embodiments of various computing systems, examples for two workload types, Java and standard tasks, are described. The choice of using two types of task for possible workload types has been made for illustrative purposes only and is not intended to limit the invention in any way. Alternate workload sets in which processing tasks may be organized into a common set of tasks to be performed on its own processor may be used in place of Java processors and Java tasks as described herein. The characteristics for the alternate workload type processor may be configured as necessary to support the particular workload type and its corresponding tasks.

Similarly, systems may be configured to contain any number of workload types. In such an embodiment, processors from a multi-processor system of FIG. 1 may be assigned to each of the custom workload types (i.e. Java, image processing, encryption, speech processing, etc.) with tasks of each type of workload. One standard processor is typically included for use by general tasks including OS related tasks. Tasks from a given workload type will be assigned to a processor of its type, if one such a processor exists. If no processor of a particular workload type exists in the system, the task is performed by a standard processor.

This invention provides a mechanism that allows a manufacturer like Unisys to specify a software serial number (aka, system ID) that is unique because it validates a single hardware serial number that must be present during serial number validation. Because the system ID is a software number, it can also be made to be persistent (unchanging) for the life of the system, regardless of any changes of the underlying validating hardware serial numbers.

The following items are included in the preferred solution: a System ID securely binds together a system type, a system serial number, and a licensing cell serial number; a system ID and licensing cell serial number are part of the System IDs that are installed like normal keys from any partition, and are stored centrally within the system; an installed system ID and licensing cell serial number are visible to every partition in the system; physical cell serial numbers for all present cells are visible to every partition in the system; if the licensing cell serial number is not present, the system ID is maintained for up to 7 days with a waiting entry indicating that the licensing cell serial number is missing; and a new System ID can be installed using the same ID and a different cell serial number if a cell is replaced.

Prior solutions generally fall into several classes. One approach is procedural. Using existing mechanisms where licensing is still hardware based, resource licensing is based upon a hardware serial number in a primary licensing cell/module. When that cell/module fails, it must be immediately replaced with a new cell. All system resource keys must be replaced with equivalent keys, and metering customers must have a new system identity established. This must be done very quickly to keep the customer down time to a minimum.

Figure 3C:
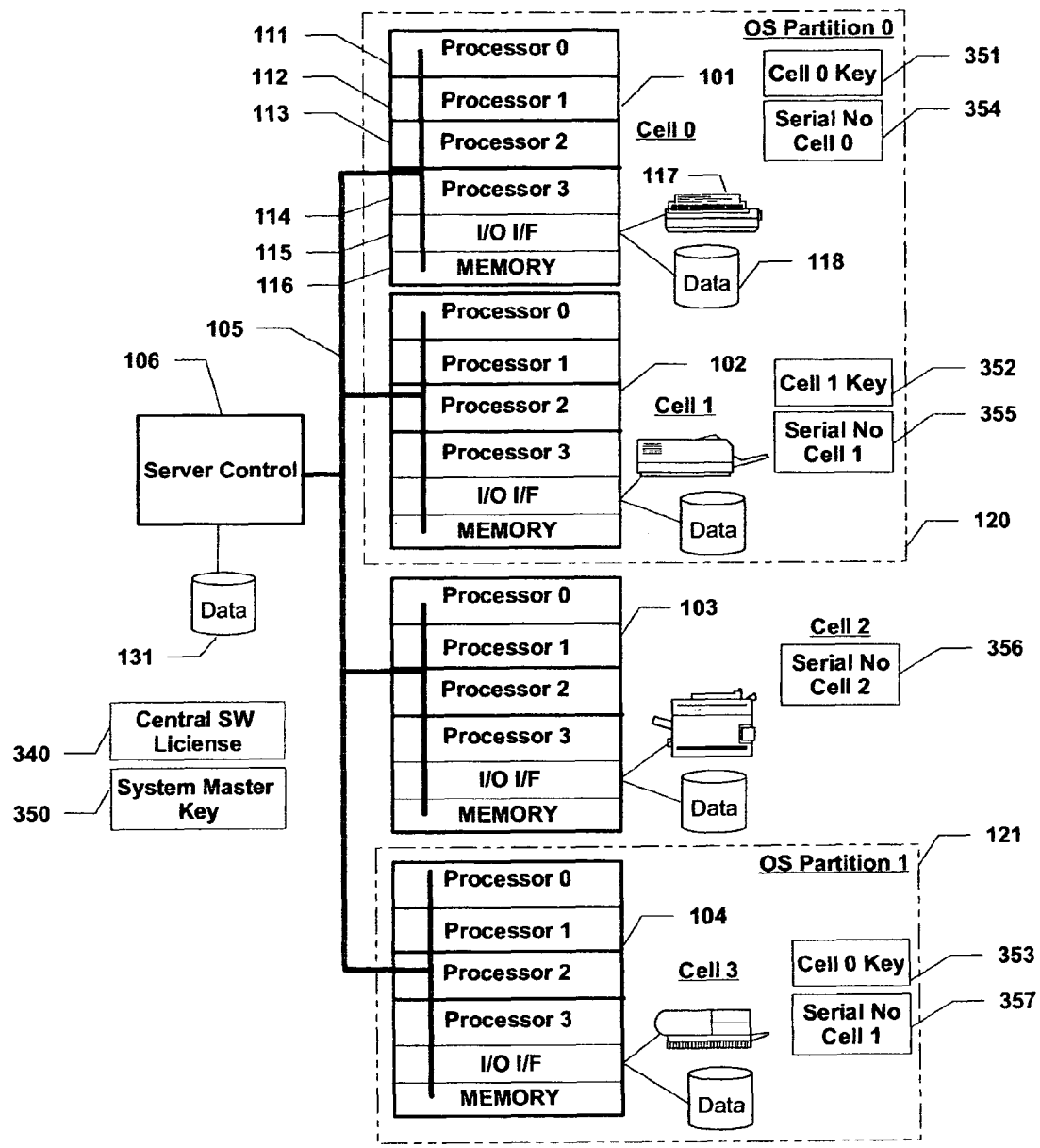

A simple approach to a software ID licensing mechanism is one where the system is centrally licensed with a key 340 that simply specifies the system ID as shown in FIG. 3c. This approach has no in-built protection against cloning because there is little protection from moving the key from one system to the next. Practices like "ghosting" are often sufficient to clone a key elsewhere, and thus the system ID would be cloned on a different system.

A more complex approach to a software system ID key licensing mechanism is one where every cell/module requires some type of key 351-353 to enable its use within the system, and a master key 350 that contains a system ID 358 value along with the IDs or the serial numbers of each cell/module 354-357. The idea behind the validation of the system ID 358 against the hardware is that it protects against cloning. To do so, the master key 350 must require that every cell/module be present. However in a real-world environment, cells/modules may be non-functional and thus may not be present. Thus in a real-world environment, the licensing rules for this approach must be somewhat relaxed and cloning is still an issue.

Figure 4A:
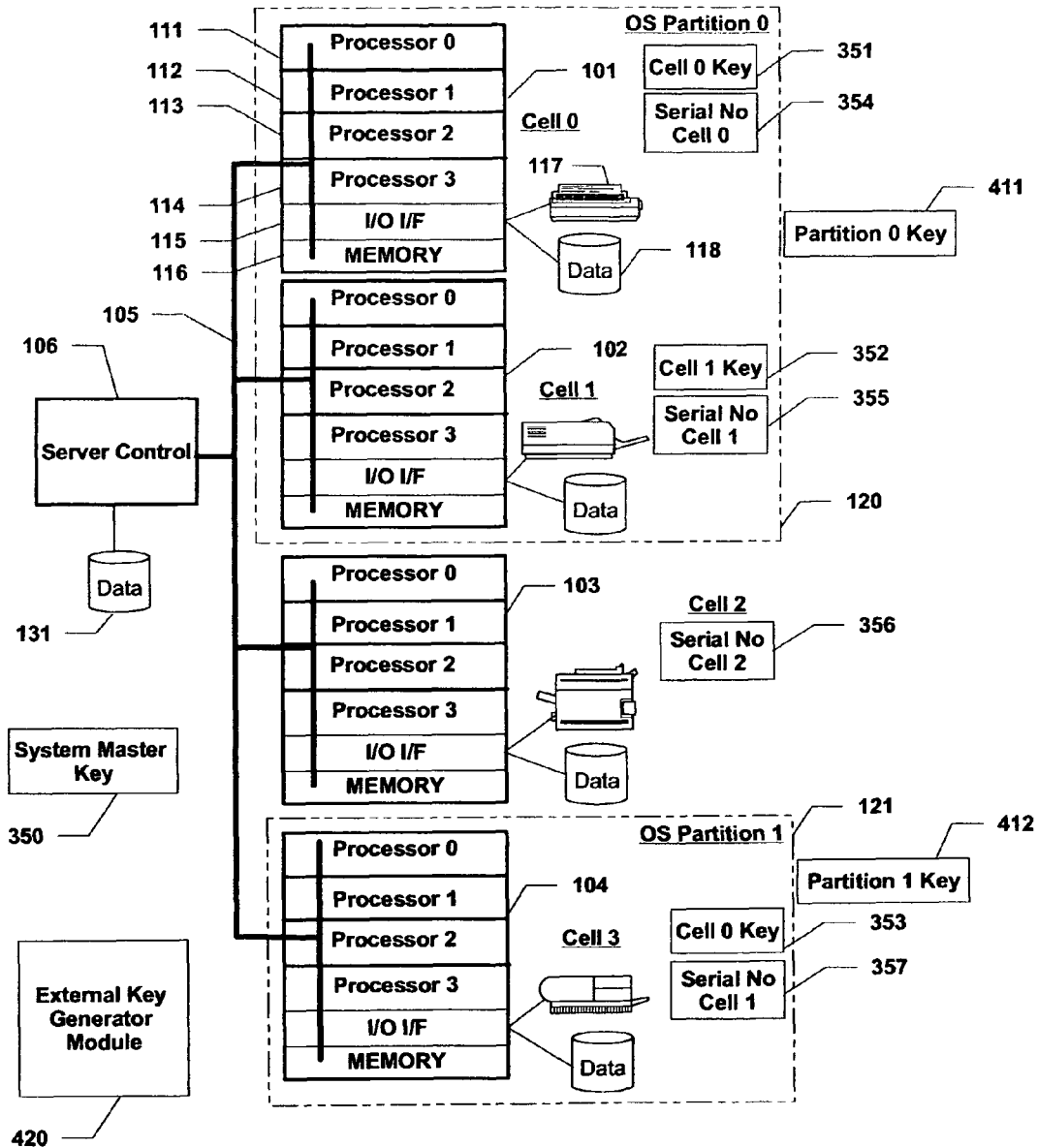

FIG. 4a illustrates an example embodiment for a computing system utilizing a System ID according to the present invention. The table in FIG. 4b identifies fields in a decrypted system ID key string. The hardware licensing entities that link a key to exactly one computer are the machine ID and the licensing cell serial number. The unique software system ID value is serial number that is intended to be the system serial number. When hardware licensing entities match the machine, the software system ID is associated with the machine and becomes the serial number for that system.

Embodiments of computing systems utilizing the present invention possess a set of characteristics that include the following. The system ID key is securely created and encrypted by an external key generation module 420, separate key creation utility. The system ID key 401, which is shown in detail in FIG. 4b, identifies the key creation timestamp 435, the system ID itself 437, the type of system the key is intended 431, and the licensing hardware cell serial number 439. The key 350 also may include a system ID version number 434 and extended version field flag 433, a machine ID 436, and a cell serial number code 438 and end code 440. Each operating system instantiation (partition) 121-122 has visibility to all of the cell serial numbers 354-357 that are physically present on the system. The system has a single location where all system-wide resource licensing data is maintained (e.g., the Server Control System Resource Licensing data structure) and each partition 121-122 has interfaces that allow updating this data. When the system ID 354-356 is installed into a partition, the key system type 431 and key licensing serial number 439 are compared to the hardware system type 437 and the hardware cell serial numbers 354-357. If there is a match of the system type 437 and any present cell serial number 354-357, then the system ID 436 and the licensing serial number 439 are transferred to the system-wide resource licensing database 131. Thus, the system ID 350 is established. All other system resource licensing, such as partition keys 411-412, are based upon the system ID. Thus processor capacity, processor metering, IO, and memory keys have the system ID 350 imbedded in the associated resource keys. The system ID 350 is revalidated periodically (once per minute) to detect changes in resource licensing state.

Figure 5A:
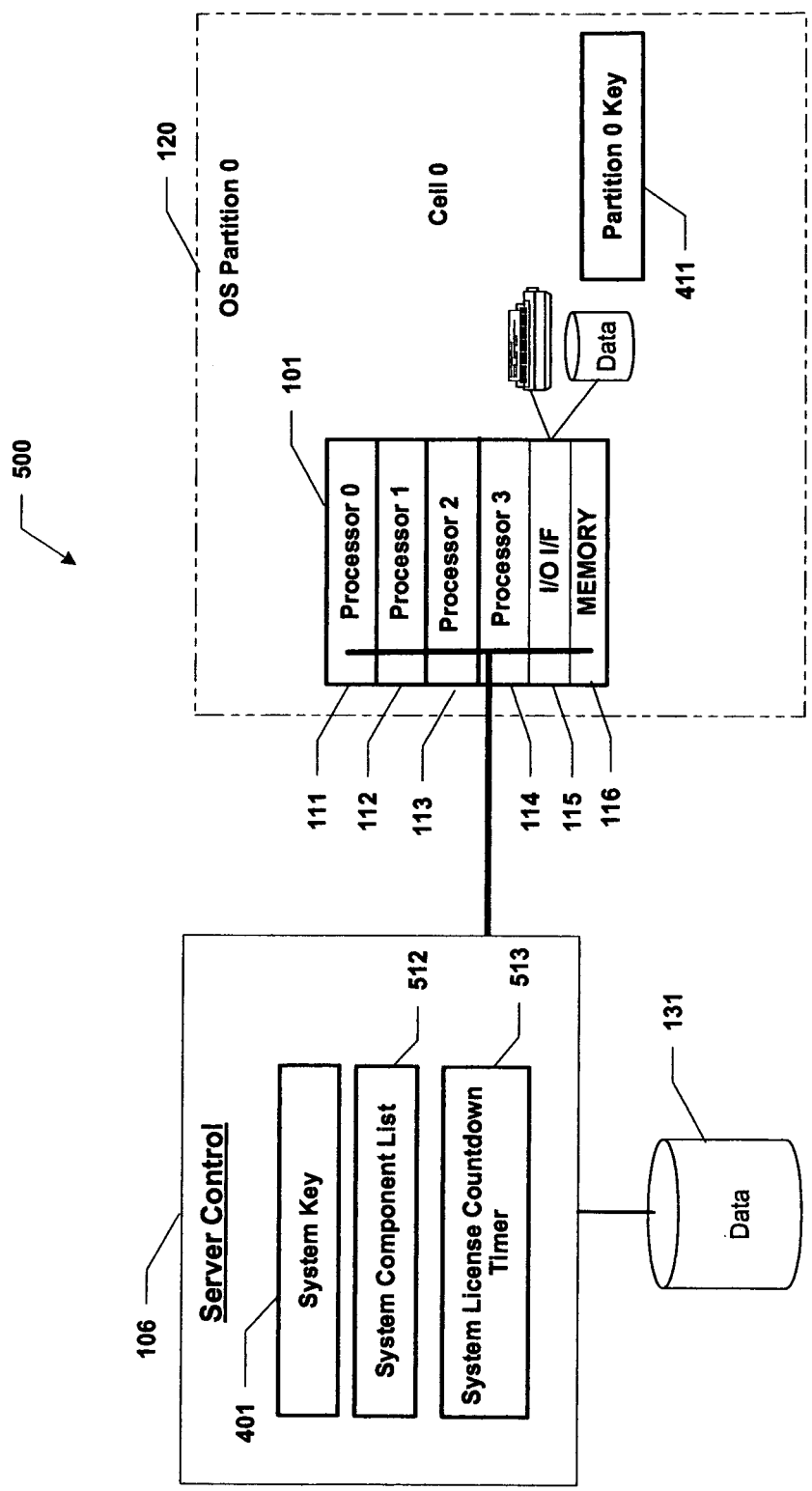

FIG. 5a-5c illustrate an example of a computing system 500 utilizing a Server Control module 106 memory map and an example of a Timing System ID data entry for use in connection with the present invention. In this example embodiment, system 500 includes a single OS partition 120 containing a single cell 101 operating under the control of server control module 106. As noted above, server control module 106 maintains system information, authorized configuration information, and associated licensing information for system 100. Server control module 106 has a database 131 of data for use in its operation. As part of this data 131, server control module 106 maintains the system key 40 1, a system component list 512 containing the identity and serial numbers for all hardware components within system 500, and a system license countdown timer 513.

As stated above the system ID 350 is revalidated periodically (once per minute) to detect changes in resource licensing state. During the revalidation process, all serial numbers, various software keys, and available configured resources are compared to the decoded values stored within server control module 106. Typically, one cell is known as a licensing cell is used to tie a system key and corresponding system ID to a particular hardware configuration. If the licensing cell is not present, the system ID goes into a 7-day countdown mode by starting system license countdown timer 513. This time 513 provides 7 days to replace a failed hardware component while permitting the system to remain operational. A warning message is posted to the system operator. The actual countdown timer 513 is maintained in the system-wide resource licensing data 131 and is visible to all partitions. If the licensing cell reappears, the 7 day countdown timer 513 stops. In an alternate embodiment, the 7 day countdown timer may be reset each time a missing licensing cell is found, typically following repair of a defective cell. When the licensing cell is replaced, a new system ID key 401 specifying the original system ID and the new licensing cell serial number can be installed into the system component list 512. Once installed, the 7 day countdown 513 is cleared and reset. Thus the system ID is perpetual even when the underlying licensing hardware is replaced. Resource licensing that is linked to the system ID is unaffected.

Cloning is prevented because: a system ID is only valid if the validating hardware is present; only one instantiation of the validating hardware serial number exists; a system ID is constantly revalidated (every minute). This allows for detection of repaired hardware without stopping the partition and prevents cloning by temporarily moving the validating hardware to another system just for the purpose of instantiating cloned partitions; a 7 day grace period cannot be reset when in use unless new System ID licensing is established (validation against a different cell serial number from the system component list 512); and the system becomes unlicensed and the performance immediately may become degraded once the 7 day grace period expires.

This invention is primarily designed for UNISYS ClearPath PLUS MCP™ systems, but the underlying invention may also apply to any modular constructed computer system where the hardware is widely distributed, and the central platform that tying the system together is software-based (i.e., no central hardware complex).

When a typical computer system 500 is ordered, a list of serial numbers 512 is typically allocated for hardware components for that system 500. For example, when a particular multi-processor computing system is ordered, a list of unique serial numbers 512 will be allocated for that system. One of the serial numbers, from a licensing cell, is used for the system ID. Other serial numbers are burnt into each cell (which contains system processor, memory, and IO resources). The cell serial number 351 is also involved in the system ID key licensing mechanism.

Installation of a specific system ID key sets up an association of a system ID with a cell serial number (by convention cell 0, but could be any cell). All system resource keys are created with the system ID imbedded in the key. These include the processor capacity or processor metering, memory resource, and IO resource keys.

When a partition 120 is running, system software periodically (every minute) checks the list of installed cell serial numbers 512. If the correct cell serial number is found then the system ID is valid and system has normal licensing. If the correct cell serial number is not found, the system ID starts a 7-day countdown period where the system ID is maintained until corrective action can be performed. This allows for replacement if a cell is broken. The system continues to run in a licensed manner during this time. If no corrective action occurs in 7 days, the system becomes unlicensed and the processor performance is reduced to a minimal level.

During the 7-day countdown period, a support organization can change the association of the system ID key with a different cell serial number even before a replacement cell is inserted. This will stop the 7-day countdown, and system licensing will return to normal. When the new association is made, the original system ID is used with a different cell serial number. Thus all processor, memory, and IO resource keys continue to function properly. Furthermore for metering systems, the corresponding billing system may be unaware that the underlying hardware had been replaced.

The solution is very simple, elegant, secure, and resilient. The system ID key contains the key creation timestamp, the system ID, the type of system, and the licensing cell serial number. The system key is created by a separate key generation utility, and the data is encrypted and transformed into a key string. Customers receive a keys file that contains the key string.

The following is an example of a system ID key string:
SYS-KP1Q4MQ9UYANJ1FG6SQQ5DJ1QHX561D9CP D4C364U0XG8JZRY0DD To license separate operating system instantiations (partitions) within a system 500 using a system license, a system-wide licensing entity is defined that is visible to each partition. For multi-processor computing systems, this entity consists of 49,152 words of memory that Server Control module 106 persists on the system 500 that can be updated by each partition. Each partition accesses the data by locking, reading, and writing to this central persistence.

This data 131 is the system resource licensing data and is managed by each partition cooperatively. All keys, usage, and timing information are contained in this structure. Server Control module 106 manages the locking synchronization, the persistence of the data, and uses this structure to convey the list of present cell serial numbers on the system.

FIG. 5b illustrates an example of a Server Control module memory map for use in connection with the present invention. For a pristine system, the system ID is not yet established and the value is set to 0. A mechanism must be in place to establish the system ID. The secure mechanism is key installation via an operator command entered from any one of the OS partitions. This operation is always performed when the system is manufactured, and is on site when the licensing cell is being replaced. Examples of the command are:
Install a key sting from a file
IK IPMERGE (HOFFMAN)KEYSFILE/SYS/SYSTEM_ID/20060227/011555 ON IO
Or directly install a key string
IK IPADD SYS-KP1Q4MQ9UYANJ1FG6SQQ5DJ1QHX 561D9CPD 4C364U0XG8JZRY0DD:1141002954

System software decrypts the key string and determines the system type, the licensing cell serial number, and the system ID; these fields are listed in the table listed under System ID Format. System software communicates with Server Control and determines what cells are present on the system by the serial numbers returned by Server Control (see FIG. 5b for a Server Control Resource Licensing Memory Map words x0006-x000D), then system software will establish the system ID by writing the system ID and the licensing cell serial number into Persistent data (see FIG. 5b for word x002B system ID and word x002D licensing cell serial number 526). This data is visible to all partitions, so every partition will become aware the system ID is now established. The key string is no longer needed and is simply discarded.

Every minute, every partition revalidates the system ID against the hardware that is physically present on the system. This is the means by which other partitions "discover" that a system ID has been established in the first place. Validation of the system ID is accomplished as follows. OS modules read the Server Control Resource Licensing data and find a non-zero system ID at word x002B. This is the system ID that is being validated. When the system ID is non-zero, the value at word x002D is the licensing cell serial number. The OS modules check that serial number against the list of serial numbers 512 returned by Server Control in words x0006-x000D. If the cell serial number is found, the system ID is valid, and the system is in a normal licensing state.

If the OS modules discover that the licensing cell serial number is not present, the OS modules start a 7-day countdown where the system ID is maintained in a timing mode (so that all resource licensing keys function normally). A waiting entry is displayed so that the customer can alert Unisys support that there is a problem with a specific cell. Because the 7-day timing window must be synchronized across all partitions, the timing information is stored in the Server Control Resource Licensing data, and is visible to every partition. The timing mechanism is a 3-word system ID timing entry of FIG. 5c.

The following timing states exist for the system ID: (1) no timing system ID entry exists; (2) the licensing cell serial number exists and no actions are needed; and (3) the licensing cell serial number does not exist. A timing system ID entry, shown in FIG. 5c, is created where word 0 has the timing flag ON 530 and the system ID value set 531, word 1 contains the current timestamp 532, and word 2 is initialized to 7 days (in seconds) 533. A timing system ID entry exists, and the system ID is not timing; the licensing cell serial number exists and no actions are needed; the licensing cell serial number does not exist. Word 0 timing flag is set TRUE and word 1 must be updated with the current timestamp. Word 2 533 contains the remaining grace period (in seconds) for the system ID; a timing system ID entry exists, and the system ID IS timing; the licensing cell serial number exists and word 0 timing flag is set FALSE 530; and the licensing cell serial number does not exist. Word 1 timestamp 531 is incremented to the current time and word 2 seconds are decremented by the difference in timestamps. Word 2 533 contains the remaining grace period (in seconds) for the system ID.

This mechanism maintains both the current system ID timing state and the remaining seconds, and prevents cloning by always maintaining a consistent non-increasing remaining seconds time period when hardware fails. Thus one cannot simply remove/restore/remove/restore a cell and gain any time back on the 7-day clock. This prevents temporary removal of a cell to another system for the purpose of cloning system resource licenses by simply moving the validating hardware to other systems.

In the event that the system ID is in the 7-day countdown period, the customer will have already contacted support services to fix the failure. The first thing support services should do is to establish system ID key licensing using a different cell (if available). If not then new system ID key licensing must be established when the replacement cell is in place.

In the event that the system ID exhausts the 7-day countdown period, the seconds left field in word 2 will have a 0 value indicating that no time remains. System resource licensing of processing capacity, processor metering, memory, and IO will fail in validation against the system ID. When no processor keys are valid, the system becomes unlicensed and all partitions start running at a very slow unlicensed rate.

There is no need to let the system go unlicensed. Proper system ID key licensing can be restored as follows. A new system ID key is created that is equivalent to the original system ID except licensing of the original system ID is associated with a different key cell serial number. Upon system ID key installation, the OS modules discover that the new licensing cell serial number exists and sets the Server Control Resource Licensing data word x002D to the new licensing cell serial number. At the same time when a new serial number link is established, system software will change any timing system ID entries to restore a full 7 day grace period in the event of hardware failure. Thus the system ID is perpetually associated with the system even though the underlying licensing hardware has been changed.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for providing a persistent, unique identifier associated with authorizing an operational configuration of a computing system, the computing system having a server control module, a plurality of cells each having at least one processor, a system ID, a licensing cell serial number, and a list of hardware component serial numbers, the method comprising:

generating a system ID key based upon the system type, the system ID, and the licensing cell serial number;

installing the system ID key within the server control module, the server control module decrypts the system ID key to extract the system type, the system ID and the licensing cell serial number, and stores the system ID and licensing cell serial number within the server control module when the system type and cell serial number match the system type and a corresponding cell serial number associated with the operational configuration of the computing system;

installing a software partition within one or more cells, the software partition corresponding to an instance of an operating system executing within the one or more cells;

maintaining the list of hardware component serial numbers currently present within the computing system within the server control module;

periodically validating permitted operation of the software partition by the software partition during execution of the software partition comparing the licensing cell serial number stored within the server control module against the list of hardware component serial numbers currently present within the computing system within the server control module to validate the system ID stored within the server control module.

2. The method according to claim 1, wherein the method further comprising:

permitting continued operation of the software partition when the software partition validates the system ID by determining that the stored licensing cell serial number is present within the list of hardware component serial numbers present within the computing system.

3. The method according to claim 1, wherein the method further comprising:

starting a countdown timer against the system ID when the software partition determines that the stored licensing cell serial number is not present within the list of hardware component serial numbers present within the computing system.

4. The method according to claim 3, wherein the software partition operates at a degraded performance level when the countdown time has counted down a predetermined length of time.

5. The method according to claim 4, wherein the predetermine length of time corresponds to seven days.

6. The method according to claim 3, wherein the method further comprising: stopping the countdown timer and resetting the countdown timer against the system ID when the software partition determines that the stored licensing cell serial number is present within the list of hardware component serial numbers present within the computing system.

7. The method according to claim 1, wherein the server control module corresponds to a separate computing system in communications with the plurality of cells via a communications network.

8. The method according to claim 7, wherein each of the cells within the plurality of cells corresponds to one or more processors, a block of memory, and communication interconnection with all of the other cells within the plurality of cells.

9. The method according to claim 1, wherein the software partition executes within one cell of the plurality of cells.

10. The method according to claim 1, wherein the software partition executes within at least two cells of the plurality of cells.

11. A non-transitory computer readable storage media, having encoded thereon program code, wherein, when the program code is executed by a machine, the machine implements a method for providing a persistent, unique identifier associated with authorizing an operational configuration of a software partition executing within a computing system, the computing system having a server control module, a plurality of cells each having at least one processor, a system ID, a licensing cell serial number, and a list of hardware component serial numbers, the method comprising:

generating a system ID key based upon the system type, the system ID, and the licensing cell serial number; and stores the system ID and licensing cell serial number within the server control module when the system type and cell serial number match the system type and a corresponding cell serial number associated with the operational configuration of the computing system;

installing the software partition within one or more cells, the software partition corresponding to an instance of an operating system executing within the one or more cells;

installing system ID key information within the server control module, the server control module decrypts the system ID key to extract the system type, the system ID and the licensing cell serial number;

retrieving the list of hardware component serial numbers currently present within the computing system from the server control module;

periodically validating permitted operation of the software partition by the software partition during execution of the software partition comparing licensing cell serial number stored within the server control module against the list of present hardware component serial numbers in order to validate the system ID stored within the server control module.

12. The non-transitory computer readable storage media according to claim 11, wherein the method further comprising:

permitting continued operation of the software partition when the software partition determines that the validated system ID matches the corresponding system ID imbedded with each performance license and resource license installed within the computing system.

13. The non-transitory computer readable storage media according to claim 11, wherein the method further comprising:

starting a system ID countdown timer when the software partition determines that the licensing cell serial number stored within the server control module does not exist in the list of hardware component serial numbers present within the computing system.

14. The non-transitory computer readable storage media according to claim 13, wherein the software partition operates at a degraded performance level when the system ID countdown time has counted down a predetermined length of time.

15. The non-transitory computer readable storage media according to claim 14, wherein the predetermine length- of time corresponds to seven days.

16. The non-transitory computer readable storage media according to claim 13, wherein the method further comprising:

stopping an active system ID countdown timer when the software partition determines that the licensing cell serial number stored in the server control module exists within the list of hardware component serial numbers present within the computing system.

17. The non-transitory computer readable storage media according to claim 13, wherein the method further comprising:

resetting a system ID countdown timer when a countdown timer reset key is installed that restores the original countdown timer period.

18. The non-transitory computer readable storage media according to claim 13, wherein the method further comprising:

resetting a system ID countdown timer when a new system ID key is installed that updates the licensing cell serial number stored in the server control module to match one of the hardware component serial numbers present within the computing system.

19. The non-transitory computer readable storage media according to claim 11, wherein the server control module corresponds to a separate computing system in communications with the plurality of cells via a communications network.

20. The non-transitory computer readable storage media according to claim 19, wherein each of the cells within the plurality of cells corresponds to one or more processors, a block of memory, and communication interconnection with all of the other cells within the plurality of cells.

21. The non-transitory computer readable storage media according to claim 11, wherein the software partition executes within one cell of the plurality of cells.

22. The non-transitory computer readable storage media according to claim 11, wherein the software partition executes within at least two cells of the plurality of cells.

\* \* \* \* \*